United States Patent

Anthony

[15] 3,653,047

[45] Mar. 28, 1972

[54] AIRCRAFT NAVIGATION RECEIVER APPARATUS

[72] Inventor: Myron L. Anthony, La Grange, Ill.

[73] Assignees: Thomas E. Dorn, Clarendon Hills, Ill.; Statistical Services, Inc., Chicago, Ill., a part interest to each

[22] Filed: Dec. 18, 1969

[21] Appl. No.: 886,054

Related U.S. Application Data

[63] Continuation-in-part of Ser. No. 713,786, Mar. 18, 1968, abandoned.

[52] U.S. Cl. ..........................343/106 R, 343/102
[51] Int. Cl. ..................................................G01s 1/46
[58] Field of Search ..........................................343/106, 102

[56] References Cited

UNITED STATES PATENTS 3,386,096  5/1968  Lundgreen et al. ...................343/106
3,495,248  2/1970  Raether et al. .......................343/106

*Primary Examiner*—Rodney D. Bennett, Jr.
*Assistant Examiner*—Richard E. Berger
*Attorney*—Kinzer, Dorn and Zickert

[57] ABSTRACT

A digital aircraft navigation receiver for comparing two constant-frequency received signals to determine the aircraft orientation, in which the received signals are differentiated to produce two gating signals; the gating signals are used to open and to close a gate that applies high-frequency clock pulse signals to a pulse counter, the counter being reset to zero in each cycle of one of the gating signals. The count in the counter determines the aircraft orientation.

20 Claims, 13 Drawing Figures

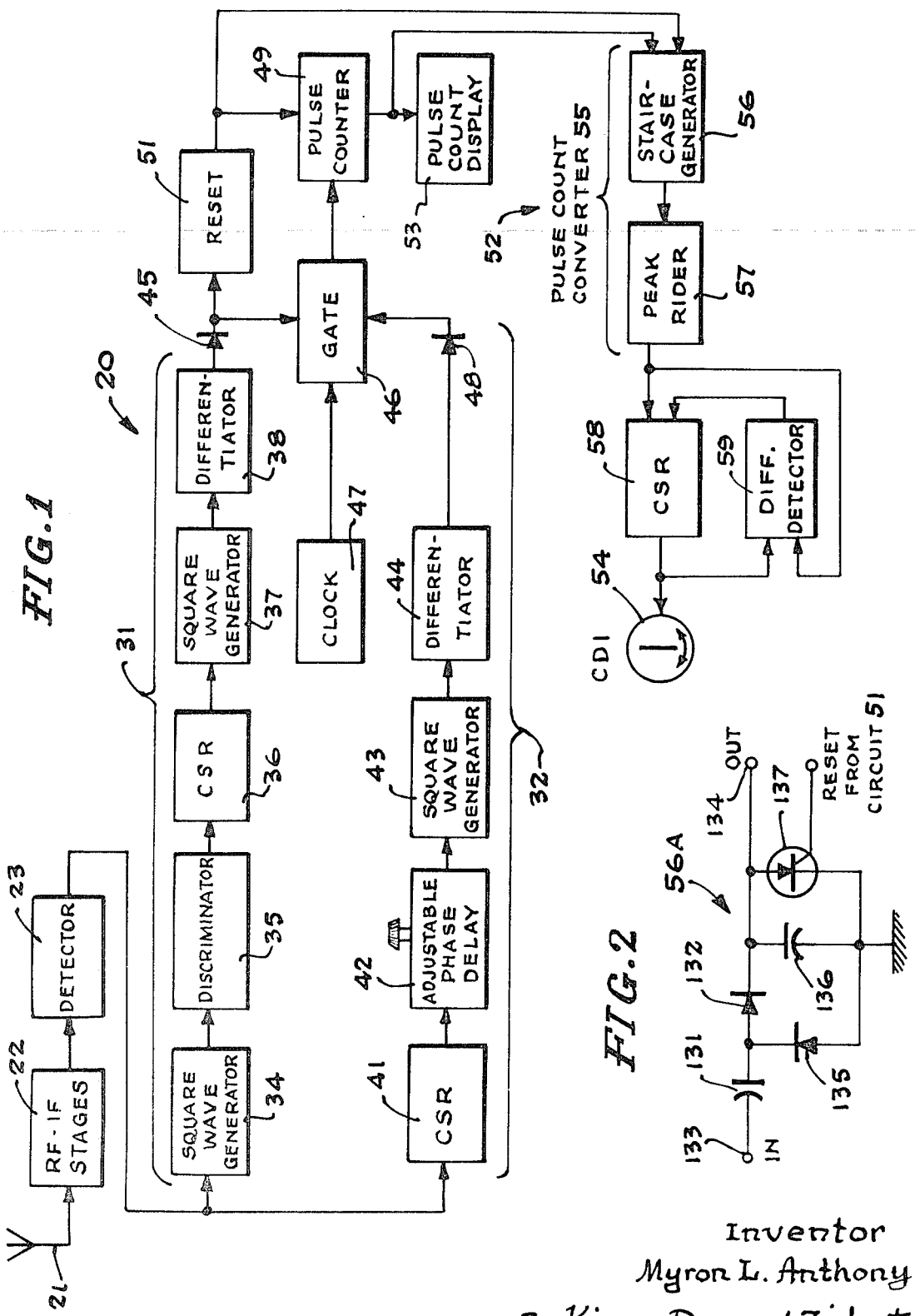

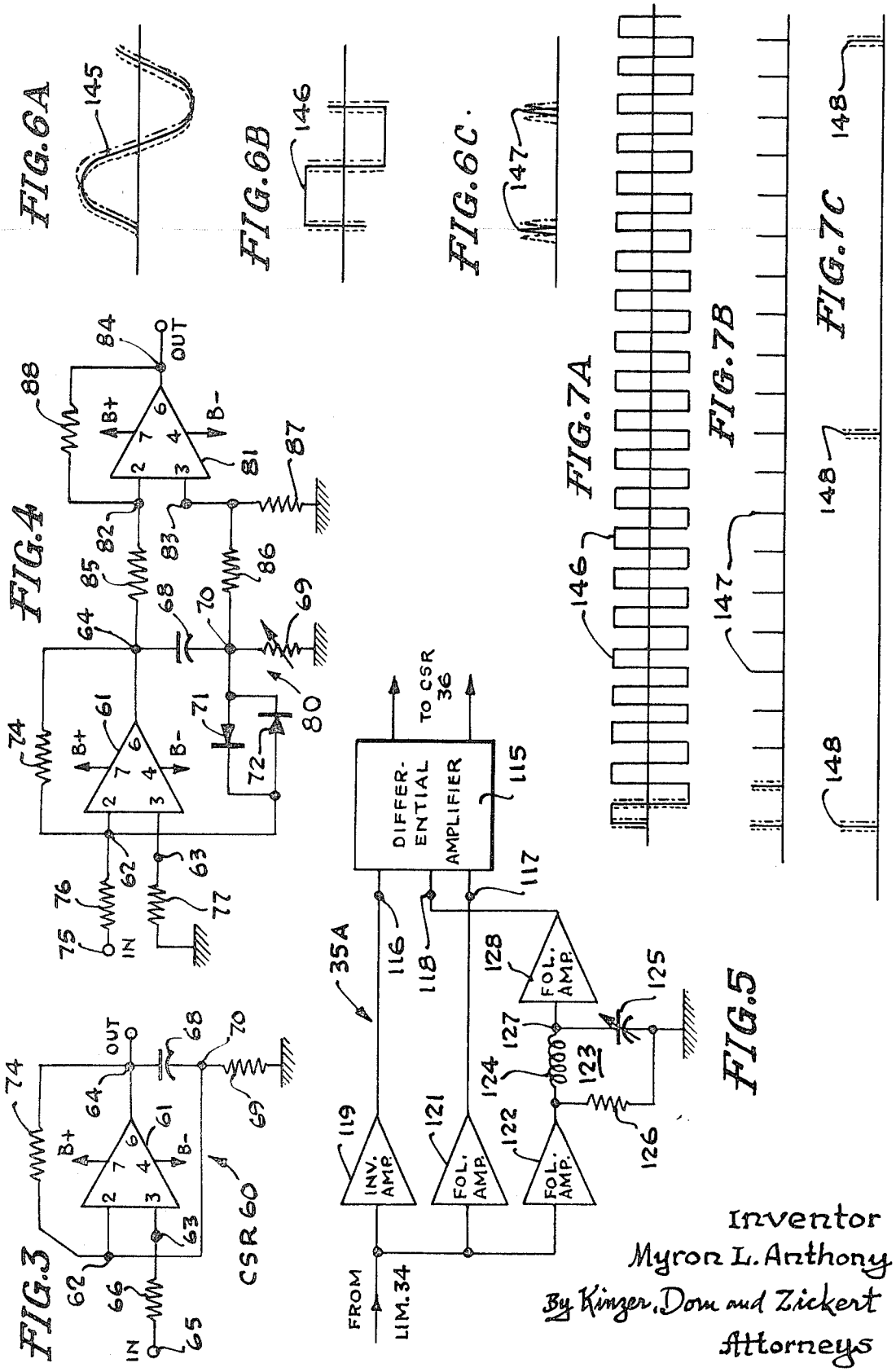

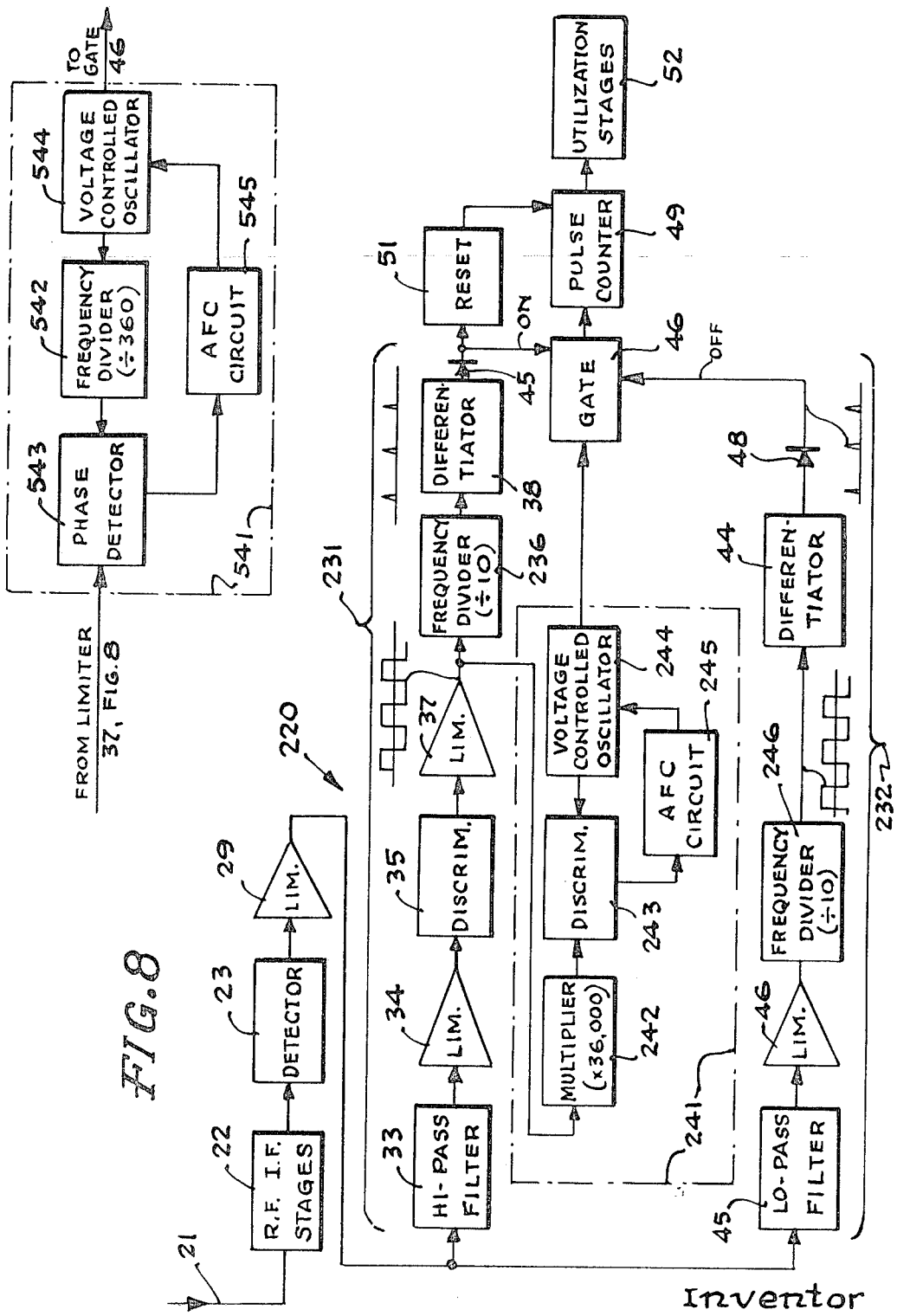

AIRCRAFT NAVIGATION RECEIVER APPARATUS

CROSS REFERENCES TO RELATED APPLICATIONS

This application is a continuation-in-part of application Ser. No. 713,786 filed Mar. 18, 1968, now abandoned. The various embodiments of the present invention utilize constant slew rate filter circuits disclosed and claimed in the copending application of Myron L. Anthony, Ser. No. 11,399, filed Feb. 16, 1970.

BACKGROUND OF THE INVENTION

Almost from the inception of the use of VOR omnirange radio navigation facilities, there have been substantial difficulties and errors apparent in the operation of the systems. A VOR transmitter radiates two signals; one is a 30 Hz. reference signal that is frequency-modulated upon a sub-carrier of 9,960 Hz., and the other is a variable-phase 30 Hz. signal. The phase relation between the two signals, as received in an aircraft navigation receiver, defines the bearing of the aircraft relative to a reference constituting a radial path intersecting the location of the transmitter.

Substantial excursion errors are frequently evident in the operation of receiver and indicator apparatus utilizing these signals, to the extent that the signals along many radials for some stations are classified as unusable for navigation purposes. The presence of these errors has long been recognized and they have usually been attributed to multipath signals created by the presence of reflectors that re-radiate the transmitted signals to the aircraft with substantial changes in phase. But this classical analysis of these "bends," "scallops," and other like errors, based on the reflection concept, is inconsistent with the facts. In typical cases, re-radiating surfaces having cross-sections 20 to 100 times those actually present would be required to create the observed errors. The principal causes of the actual errors have not previously been generally known and no basic solution to the problem has heretofore been advanced.

A similar problem exists in relation to the ILS systems employed for the critical operation of landing aircraft under adverse weather conditions. Present ILS systems utilize two radiated signals, one of 90 Hz. and the other of 150 Hz., modulated upon suitable carriers. These signals are detected and compared to indicate a reference path constituting a desired glide path, the glide path constituting a zone in which the received signals are of approximately equal amplitude.

In aircraft navigation receiver apparatus, as employed in the prior art, it has been customary to use so-called "passive" band-pass filter circuits to eliminate extraneous frequencies from the data signals as received and detected. These passive filter circuits, sometimes referred to as "linear" filter circuits, while highly satisfactory and effective in many fields of application, frequently introduce substantial errors into the aircraft navigation data signals. The asymmetrical characteristics of these filters cause selective side band attenuation, producing substantial phase shift distortion in the data signals in the presence of low frequency amplitude modulation of the received signals.

Any minor change in the frequency of the data signals also affects the attenuation characteristics of the band-pass filters. Because attenuation and phase shift are closely related, a serious phase error frequently results. Changes in filter impedances, due to aging or temperature effects, have the same result.

The frequency discriminators and phase detectors used in modern VOR receivers also produce spurious responses and substantial phase shifts in the presence of amplitude modulation in the received signals, including amplitude modulation that may occur at very low frequencies. The detector and discriminator circuits customarily employed are square law devices, in their function, and consequently are susceptible to harmonic distortion. They also produce substantial phase shifts in response to unbalanced noise and in response to relatively minor frequency changes. In at least one widely used VOR receiver phase detector, it can be shown that an amplitude ratio of 2:1 between the reference and variable-phase signal voltages produces an indicator movement change of more than 25 percent.

SUMMARY OF THE INVENTION

It is a principal object of the invention, therefore, to provide an aircraft navigation receiver apparatus that incorporates active filter circuit means, instead of the passive filters of the prior art, and that is effective to minimize or eliminate extraneous frequencies from the received data signals without introducing phase distortion or other errors into those signals. The active filtering circuit means employed are immune to amplitude modulation effects, minor frequency changes, and component aging or other drift; they exhibit exceptional noise immunity and stability.

In this specification and in the appended claims, the terms "active filter" and "active filtering means" are each defined as meaning an amplifier circuit or pair of amplifier circuits, having a relatively limited and constant following rate and utilized as a band-pass, low-pass, or high-pass filter, which affords essentially zero phase distortion over its complete operating frequency range. The active filters referred to herein may introduce a fixed constant phase shift of 90°, or some multiple thereof, but this is not considered to constitute phase distortion.

Another object of the invention is to provide aircraft navigation receiver apparatus that effectively eliminates low-frequency amplitude-modulation distortion in the operation of discriminator circuits in the receiver apparatus, and that is unaffected by unbalanced noise in the received signals.

A particular object of the invention is to provide an aircraft navigation receiver that functions as a digital device instead of an analog apparatus.

Accordingly, the invention is directed to aircraft navigation receiver apparatus of the kind in which first and second data signals of given frequency radiated from a navigation station are compared to determine the orientation of the aircraft relative to a reference. The receiver apparatus comprises first and second signal channels for developing first and second gating signals representative of the phase and frequency of the first and second data signals, respectively. The receiver apparatus further comprises a source of a clock pulse signal having a frequency many times higher than the frequency of either data signal, pulse counter means, and gate means having an input connected to the clock signal source and an output connected to the pulse counter means. Means are provided for applying the gating signals to the gate means to actuate the gate between open and closed conditions, whereby the count in the pulse counter is representative of the phase differential between the first and second data signals. Display means, coupled to the pulse counter, informs the pilot of the orientation of the aircraft, based on the count in the pulse counter.

DESCRIPTION OF THE DRAWINGS

FIG. 1 is a block diagram of one form of aircraft navigation receiver apparatus constructed in accordance with the present invention;

FIGS. 2, 3 and 4 are schematic illustrations of individual circuits that may be used in the navigation receiver apparatus of FIG. 1;

FIG. 5 is a block diagram, partly schematic, of a preferred form of discriminator for the receiver apparatus of FIG. 1;

FIGS. 6A through 6C are waveform diagrams employed to explain a potential source of error in the operation of the receiver of FIG. 1;

FIGS. 7A through 7C are waveform diagrams employed to explain a means for correcting a potential error;

FIG. 8 is a block diagram of an aircraft navigation receiver apparatus constructed in accordance with another embodiment of the invention; and FIG. 9 is a block diagram of another form of clock circuit for the receiver of FIG. 8.

DESCRIPTION OF THE PREFERRED EMBODIMENTS

FIG. 1 illustrates an aircraft navigation receiver apparatus 20, in this instance a VOR receiver, constructed in accordance with one embodiment of the present invention. Receiver 20 includes an antenna 21 connected to a preliminary input stage 22 that may include a radio-frequency amplifier, a mixer circuit, a local oscillator, and an intermediate-frequency amplifier. It will be recognized that these circuits are generally conventional; they constitute the initial input stages of receiver 20. The output of stage 22 is connected to a detector 23, which may be of conventional construction.

The output signal from detector 23 is coupled to a first signal channel 31 and to a second signal channel 32. The first signal channel 31 includes, in series, a square wave generator 34 (e.g., a limiter amplifier or zero crossing detector), a discriminator 35, a constant slew rate (CSR) filter circuit 36, and a limiter amplifier or other square wave generator 37. The output stage of channel 31 is a differentiator 38. Channel 31 is the reference data signal channel for the receiver.

The limiter amplifier or other square wave generator 34 is utilized to restrict the amplitude of the data signal transmitted through channel 31 to a predetermined maximum and is incorporated in the signal channel primarily to preclude phase distortion of the reference data signal as that signal is processed in discriminator 35. Discriminator 35 may be of conventional construction, but preferably is a form of discriminator, constituting a product detector circuit, that minimizes phase distortion in the output signal. A specific preferred form of discriminator is described hereinafter in conjunction with FIG. 5. The limiter amplifier, crossover detector, or other square wave generator 36 may be of conventional construction and again assures the reduction of the data signal to a substantially rectangular waveform of constant amplitude.

In the first signal channel of receiver 20, the reference data signal channel 31, the constant slew rate filter 36 affords an active filtering means as defined above. The active filtering means is discussed more fully hereinafter in connection with the circuits illustrated in FIGS. 3 and 4.

The second signal channel 32 of VOR receiver 20 is the signal channel for the 30 Hz. variable phase signal. It comprises a constant slew rate circuit 41 utilized as a low-pass filter. CSR circuit 41, which constitutes an active filter for channel 32, as defined above, is connected to an adjustable phase delay circuit 42. The adjustable phase delay circuit 42 may comprise a conventional OBS resolver for effecting an adjustable phase shift in the signal translated through channel 32. On the other hand, circuit 42 may be a digital phase delay device, such as a variable-delay one-shot trigger circuit. The output of delay circuit 42 is connected to a limiter amplifier or other square wave generator 43 followed by a differentiator 44.

The output of differentiator 38, in reference channel 31, is coupled through a diode 45 to one triggering input of a gate circuit 46. The signal input for gate 46 is derived from a clock source 47 having a frequency many times higher than the frequency of the data signals of the navigation system in which receiver 20 is employed. The clock frequency is preferably a high decimal multiple of 360 times the data signal frequency of 30 Hz., so that each clock pulse represents a decimal fraction of 1°; thus, the frequency of a typical clock source 47 may be 10.8 Hz. However, other frequencies, such as a high multiple of 60 times the data signal frequency, giving readings in fractions of minutes of arc, can also be used.

In the second signal channel 32 of receiver 20, the output of differentiator 44 is coupled through a diode 48 to a second triggering input for gate circuit 46.

Receiver apparatus 20 further includes a pulse counter 49. Counter 49 is connected to the output of gate circuit 46. The counter is provided with a reset circuit 51 that is connected to the output of differentiator 38. Pulse counter 49 is coupled to a utilization stage 52 for receiver 20 which may include an appropriate indicator 53 actuated in accordance with the count in counter 49 to give a direct numerical readout of the aircraft bearing to the pilot.

The utilization stage 52 of receiver 20 may also include a conventional position indicator, such as a constant deviation indicator instrument 54. To drive indicator 54, the output of pulse counter 49 is coupled to a pulse count converter 55 comprising, in series, a staircase generator 56 and a peak rider circuit 57. Converter 55, which converts the pulse count to an analog signal, is coupled to the input of indicator 54 through a CSR circuit 58. A catch-up system for the indicator is provided, comprising a differential comparator 59 having two inputs, one taken from the output of circuit 57 in converter 55 and the other taken from the output of CSR circuit 58; the output of the differential comparator is coupled back to CSR circuit 58 to control its slewing rate. The peak rider circuit 57 may correspond to a peak reading voltmeter circuit; the staircase generator 57 may utilize the circuit described in connection with FIG. 2. Other forms of pulse count to analog converter can be utilized as desired.

Much of the basic operation of receiver 20 is essentially similar to that of a conventional VOR receiver and hence will be described only briefly in this specification. A VOR signal transmission intercepted as antenna 21 is amplified and heterodyned in the initial stage 22 of receiver 20, producing an IF output signal. The IF signal from stage 22 is detected in circuit 23, producing an output signal that is amplitude modulated in accordance with the 30 Hz. variable phase signal required for channel 32 and with the 9,960 Hz. sub-carrier upon which the 30 Hz. reference signal has been frequency-modulated at the VOR transmitter.

The reference signal and the variable phase signal are separated from each other into channels 31 and 32, respectively. The output signal from detector 23, including both the 9,960 Hz. reference subcarrier signal and the 30 Hz. variable phase signal, is applied to limiter 34. The output from limiter 34 is supplied to discriminator 35, which is tuned to the 9,960 Hz. subcarrier. Thus, the output of discriminator 35 is, essentially, the 30 Hz. reference signal. But this signal may contain many harmonics and substantial noise. These extraneous signals and harmonics are effectively eliminated by the active filter comprising the CSR circuit 36, so that the output of filter 36, as applied to differentiator 38, is a 30 Hz. reference signal of fixed phase. The signal supplied to the discriminator has been converted to rectangular waveform in circuit 37.

The low-pass filter in the input to channel 32, the CSR active filter 41, on the other hand, passes the 30 Hz. variable phase signal into channel 32 but attenuates the 9,960 Hz. reference subcarrier to a level at which it is essentially imperceptible. The phase of the signal in channel 32 may be adjusted to conform to a given reference, in circuit 42, and is converted to rectangular waveform in circuit 43. Thus, the signal supplied to differentiator 44 is a 30 Hz. signal that varies in phase to indicate the bearing of the aircraft.

Conventional filtering circuits employed in a VOR receiver, and particularly in the separate data signal channels for the two 30 Hz. signals, frequently introduce substantial phase differentials as the result of amplitude modulation and other distortions in the incoming signals. To be specific, the lack of symmetry around the 30 Hz. data signal frequency, in typical conventional passive filter circuits, may produce errors of 6° to 7° in the presence of amplitude modulations at 2 Hz. or other low frequencies, often present. Furthermore, any deviation in the transmitted signals, from the 30 Hz. standard, can produce substantial phase error in conventional receiver filter circuits. Other phase errors, where conventional R-C filters are used, are caused by aging of the circuit components.

The active filtering means 36 and 41 incorporated in signal channels 31 and 32, on the other hand, produce no appreciable phase distortion regardless of substantial amplitude changes. Furthermore, the active filtering means in these two signal channels effectively eliminate the harmonics of the reference and variable phase signals and other noise signals that are often present. Moreover, the active filters of receiver 20 are inherently self-limiting and stable and are not materially affected by aging of their components; these circuits are also unaffected by variations from the 30 Hz. standard that may occur in the original transmission.

The basic operation of active filters, in a VOR receiver such as receiver 20, is described in detail in the original patent application, Ser. No. 713,786 identified above. Thus, the integrator filters and constant-current filters described in the earlier application can be utilized in receiver 20 to eliminate extraneous harmonics and other unwanted signal excursions without introducing the phase distortions prevalent in conventional passive filters. For example, each of filters 36 and 41 may comprise a series constant current circuit with a shunt capacitor, as described more fully in application Ser. No. 713,786. But the preferred form of active filtering for receiver 20 utilizes constant slew rate circuits as described in application Ser. No. 11,399 filed Feb. 16, 1970; two examples are given in FIGS. 3 and 4.

FIG. 3 illustrates a constant slew rate circuit 60 that may be utilized as either of the two active filters 36 and 41 in the signal channels 31 and 32 of receiver 20 and that may also be utilized as the response rate control circuit 58 in the utilization stage of the receiver. CSR circuit 60 comprises an integrated solid state operational amplifier 61 having an inverting input terminal 62, a non-inverting input terminal 63, and an output terminal 64. Terminal 64 is the output terminal for the CSR circuit. Amplifier 61 is also provided with appropriate terminals for connection to power supplies B+ and B−. The CSR circuit has an input terminal 65 connected to the non-inverting amplifier input 63 by a series resistor 66.

CSR circuit 60 further comprises a capacitor 68 connected to output terminal 64. A low, non-reactive sensing impedance comprising a small resistor 69 is connected from capacitor 68 to a ground plane of reference potential. A rate-limiting feedback circuit connects the common terminal 70 of capacitor 68 and resistor 69 back to the inverting input 62 of amplifier 61. The CSR circuit also includes a negative feedback DC stabilization circuit comprising a large resistor 74 connected from output terminal 64 to the inverting amplifier input 62.

A positive-going step function signal applied to the input terminal 65 of CSR circuit 60 produces an amplified signal of the same polarity at the output terminal 64 of the circuit. The positive-going voltage developed at output terminal 64 begins to charge capacitor 68 through sensing resistor 69. The voltage drop across resistor 69 is a function of the charging current through capacitor 68; this voltage is applied to the inverting input 62 of amplifier 61 through the rate-limiting feedback circuit connecting terminals 70 and 62. The output voltage of the amplifier is such that the voltage across sensing resistor 69 exactly matches the input voltage to terminal 65. Moreover, with a constant voltage drop across sensing impedance 69 the charging rate of capacitor 68 is a straight line function having a constant slope or "slewing rate." The slewing rate for CSR circuit 60 is determined by the impedances of capacitor 68 and resistor 69 and by the amplitude of the input voltage. The direction of the slope depends upon the polarity of the input signal; a negative-polarity signal supplied to amplifier 61 through input resistor 66 produces the same result as described above except that the output signal is a negative-going signal. The slewing rate of the circuit can be adjusted by changing the impedance of either capacitor 68 or resistor 69.

From the foregoing description, it can be seen that a square wave input to CSR circuit 60 produces an output signal of triangular waveform. Furthermore, the CSR circuit functions as a highly efficient low-pass filter. For all practical purposes, the response characteristic of the CSR circuit 60 corresponds to that of a servo system having a maximum slewing rate imposed by the top speed of the servo motor, but with the important difference that the CSR circuit exhibits essentially zero inertia. The attenuation characteristic is approximately 6 db per octave. Moreover, the phase shift for the circuit is zero though a given corner or cut-off frequency determined by the impedances of capacitor 68 and resistor 69. Above the corner frequency, the phase shift is 90°. Amplitude changes, and frequency variations below the cut-off frequency, produce no phase changes. Moreover, the CSR circuit is essentially immune to phase distortion from aging of circuit components.

FIG. 4 illustrates another constant slew rate circuit 80 that may be employed for either of the filters 36 and 41 in the receiver 20 and that is particularly suitable for the rate-limiting filter 58 in the input to indicator 54. CSR circuit 80 comprises an initial stage that is generally similar to the circuit of FIG. 3 and includes a solid state integrated operational amplifier 61 having an inverting input terminal 62, a non-inverting input terminal 63, and an output terminal 64. In CSR circuit 80, the input terminal 75 for the circuit is connected through a series resistor 76 to the inverting input terminal 62 of amplifier 61. The non-inverting input terminal 63 of the amplifier is connected to a resistor 77 that is returned to ground.

As in the circuit of FIG. 3, the CSR circuit 80 of FIG. 4 includes a capacitor 68 that is connected in series with a small sensing resistor 69 between the output terminal 64 of amplifier 61 and system ground. A rate-limiting feedback circuit is provided, between the common terminal 70 of capacitor 68 and resistor 69 and the inverting input terminal 62. A pair of diodes 71 and 72 are connected in parallel with each other, but in reverse polarity, in this feedback circuit. Diodes 71, 72 establish the point at which slew rate limiting is effected. A DC stabilization feedback circuit is provided by a large resistor 74 connected between amplifier terminals 64 and 62.

As thus far described, CSR circuit 80 is generally similar in operation to circuit 60. For slow-changing input signals (low slew rates), however, the voltage across resistor 69, which is proportional to the slew rate, may be less than the drop across diodes 71 and 72. For such signals, the rate feedback to terminal 62 is blocked and amplifier 61 functions as a unity gain inverting amplifier.

For higher slew rates the voltage across resistor 69 reaches the diode drop potential and diodes 71, 72 conduct the rate feedback signal. The gain of amplifier 61 is controlled so that the drop across resistor 69 exactly matches the diode drop, establishing a constant, limited slew rate output. The DC gain of the circuit is unity and circuit operation is extremely stable. However, the voltage drop across diodes 71 and 72 introduces a minor problem with respect to high-frequency suppression; at high frequencies, the output includes a small but perceptible square wave component caused by the voltage drop across the two diodes. Moreover, the attenuation curve drops off to a constant level and does not reach zero.

This difficulty is overcome, in CSR circuit 80, by a second stage comprising an integrated solid state operational amplifier 81 utilized to subtract the small square wave component from the output of the circuit. The inverting input terminal 82 of amplifier 81 is connected to the output terminal 64 of amplifier 61 by a series resistor 85. A DC feedback circuit is provided from the output terminal 84 of amplifier 81 to the inverting input terminal 82, this circuit comprising a resistor 88 having the same impedance as resistor 85. The non-inverting input terminal 83 of amplifier 81 is connected to a voltage divider comprising two resistors 86 and 87 connected from terminal 70 to system ground.

In analyzing the operation of the CSR circuit 80, it should be remembered that for an operational amplifier the voltage difference at the input terminals is essentially zero, and that there is negligible current flow into the input terminals. Since the non-inverting input terminal 63 of amplifier 61 is at system ground potential, the inverting input terminal 62 is also at ground. Thus, the drop across diodes 71 and 72 appears at the other terminal 70 of the diodes relative to ground. The square wave diode drop is in phase with the triangular output signal of amplifier 61 and must be subtracted from that signal to afford a clean constant-slope triangular wave output.

The second amplifier 81 in CSR circuit 80 is connected as a 1:1 inverting amplifier. The diode drop signal is fed into the non-inverting input terminal 83 of amplifier 81 and consequently is subtracted from the triangular output signal supplied to the inverting input 82 of the same amplifier. Resistors 86 and 87 are of equal impedance and hence comprise a 2:1 voltage divider. This is necessary because the gain of amplifier 81 is two for non-inverting input signals. It is thus apparent that the square wave diode voltage drop signal is effectively subtracted from the output signal of the first stage of CSR circuit 80, in the second stage amplifier, producing a clean constant-slope output signal at terminal 84.

As noted above, the discriminator circuit 35 of reference signal channel 31, if of conventional construction, may well constitute a substantial source of phase distortion as the result of sensitivity of the discriminator to amplitude changes and other factors. A discriminator that is not perfectly linear and symmetrical around the subcarrier frequency of 9,960 Hz. will produce phase shift (bearing scallops) in the presence of multipath, standing wave modulation. Also, the output of a conventional discriminator must be filtered to remove the 9,960 Hz. subcarrier. Phase delay and calibration errors are commonly introduced with conventional filtering.

FIG. 5 illustrates a preferred form of discriminator 35A, that effectively minimizes and in fact virtually eliminates errors arising from this source. Discriminator 35A is a multiplying circuit that is essentially similar in many respects to the discriminator circuits described in U.S. Pat. No. 3,024,419, to Myron L. Anthony; accordingly, only a relatively simplified description is required in this specification and in FIG. 4.

Discriminator 35A comprises a push-pull differential amplifier 115 having two individual input terminals 116 and 117 and a common input terminal 118 for both stages of the push-pull amplifier. The 9,960 Hz. square wave signal from limiter 34 is supplied to terminal 116 of amplifier 115 through an inverting amplifier 119. The reference subcarrier signal from limiter 34 is also supplied to terminal 117 of amplifier 115, but through a follower amplifier 121. That is, the reference signal is applied to the two input terminals 116 and 117 of the differential push-pull amplifier 115 in phase opposition.

The square wave reference signal from circuit 34 is also applied to the input of a follower amplifier 122. The output of amplifier 122 is applied to a phase shifting circuit 123 comprising a series inductance 124 and an adjustable capacitor 125 that is connected from the output terminal of inductance 124 to ground or other source of reference potential. A resistor 126 is included in the phase shift circuit, being connected between the output terminal of amplifier 122 and ground. The common terminal 127 of inductance 124 and capacitance 125 is connected to the input of a follower amplifier 128. The output of amplifier 128 is connected to the common input terminal 118 of the push-pull differential amplifier 115.

In operation of discriminator circuit 35A, FIG. 5, the signal levels for amplifiers 119 and 121 are selected so that both stages of the push-pull amplifier 115 are driven to saturation in alternate half cycles of the reference subcarrier signal. At the same time, the reference signal is supplied to both stages through the common input terminal 118 but with a phase shift of 90° induced by circuit 123. This signal cuts off both stages of the differential amplifier on alternate half cycles but with a 90° phase shift relative to the two individual input signals. Under these circumstances, the two input signals from amplifiers 119 and 121 are multiplied together in amplifier 115, producing an output constituting a signal representative of the 30 Hz. frequency-modulation on the reference subcarrier input, this signal being supplied to CSR circuit 36. The operation of the "product detector" discriminator circuit is described in greater detail in the aforementioned U.S. Pat. No. 3,024,419 of Myron Anthony. Of significant importance is the fact that the amplitude of the output signal supplied to CSR circuit 36 is independent of amplitude changes in the input signals to differential amplifier 115, so long as the input signal amplitudes remain great enough to drive each stage of the differential amplifier to saturation in each half cycle of operation. Furthermore, the output signal from the differential amplifier is not affected by distortions in the waveform of the input signals; substantial noise and harmonic distortion can be tolerated in the input to the discriminator 35A and is effectively eliminated in the output of that circuit.

Referring again to receiver 20, FIG. 1, each of the two data signals (the 30 Hz. reference signal developed by discriminator 35 in channel 31 and the 30 Hz. variable phase signal from the output of filter 41 in channel 32) is differentiated and rectified. Thus, each of the gating signals supplied to gate 46 constitutes a series of pulses recurring at the start of each full cycle of one of the data signals. Gate circuit 46 is a flip-flop circuit actuatable between a conductive and a non-conductive condition. The reference gating signal from channel 31 opens the gate and the variable phase gating signal from channel 32 closes the gate.

Whenever the gate is open, the high-frequency signal from clock source 47 is transmitted through gate 46 to pulse counter 49. Accordingly, it is seen that the total count in counter 49 is representative of the phase differential between the reference gating signal and the variable phase gating signal. If clock source 47 is operated at a rate of 360 times the 30 Hz. data signal frequency, a frequency of 10.8 kHz., the pulse count for counter 49 is directly presented in degrees; that is, one pulse in the count represents 1° of phase differential. For greater resolution, clock source 47 can be operated at a higher multiple as, for example, 108 kHz., affording a pulse count accurate to 0.1°. For a resolution of 0.01°, the clock source may be operated at a frequency of 1,080 kHz. For a resolution of 1 minute of arc, the clock frequency would be 648 kHz.

A direct digital readout of the aircraft bearing, taken from the pulse count in counter 49, can be provided by a suitable numerical display or utilized in connection with other aircraft equipment. It is usually desirable, also, to afford an indicator display such as the CDI instrument 54 in addition to the numerical display. To this end, the pulse count from counter 49 is supplied to the converter 55 to develop an analog signal suitable for driving the CDI display. The response rate of the analog display is limited by the CSR circuit 58, thereby avoiding spurious indications of major course aberrations that could be caused by high-amplitude short-duration transients and other erroneous signals. The differential detector 59 continuously compares the output of CSR circuit 58 with its input; whenever a substantial differential is sustained over an appreciable time interval, the output of detector 59 that is fed back to CSR circuit 58 operates to increase the slewing rate of the CSR circuit and allows the indicator to catch up to the incoming signals. The CSR circuit 80 illustrated in FIG. 4 is particularly suitable for use as CSR circuit 58 in receiver 20.

The staircase generator 56 of pulse count converter 55 (FIG. 1) may comprise the specific circuit 56A illustrated in FIG. 2. Circuit 56A comprises a small input capacitor 131 connected in series with a diode 132 between the input terminal 133 and the output terminal 134 of the circuit. A diode 135 is connected from the common terminal of capacitor 131 and diode 132 to system ground; a large storage capacitor 136 is connected from output terminal 134 to system ground. A signal-controlled discharge device 137 (shown as a SCR) is connected in parallel with capacitor 136 and is used to discharge the storage capacitor in synchronism with the resetting of pulse counter 49, the gate electrode of device 137 being supplied with a reset signal from circuit 51 (FIG. 1).

The aircraft navigation receiver apparatus 20 affords a fully digital operation instead of the analog operation of most previously known receivers. It eliminates many of the sources of phase error in conventional receiver apparatus.

One possible source of limited error that may occur in operation of receiver 20 is illustrated by the waveforms of FIGS. 6A through 6C. The initial signal output from discriminator 35, for example, may be a substantially sinusoidal signal as represented by curve 145 in FIG. 6A. The corresponding output signal for circuit 37 is the rectangular waveform 146 of FIG. 6B. The differentiated gating pulse signal developed at the output of diode 45 is the spike signal 147 of FIG. 6C. Accuracy of operation of the circuit may be reduced somewhat by pulse "jitter" resulting from noise in the received VOR signals, as indicated by the dash and phantom line signals in FIGS. 6A through 6C. This time-distortion is carried through the digitizing circuits, in those instances where it may occur.

This source of error, however, can be effectively reduced to a point of insignificance if the incoming signal frequency is divided by a substantial factor. This is illustrated in FIGS. 7A through 7C. If the signal 146 is reproduced directly, each cycle of the resulting gating signal 147 may be displaced, in time, to reflect the roughness of the incoming signal. But division of the signal frequency by a factor of 10 as illustrated by the gating signal 148 of FIG. 7C reduces the jitter to a level of insignificance. The total jitter is actually the same but it now signals the beginning and end of a total of 10 cycles, so that overall accuracy is improved by a factor of 10. This can be considered a form of correlation in which the improvement in accuracy is a function of the sampling time. In the case of a VOR receiver, the factor of 10 is approximately correct since it encompasses a reduction from 30 Hz. to 3 Hz., a time interval of roughly one-third second. An aircraft travelling at 600 miles per hour will traverse only approximately 330 feet between samples, representing an acceptable maximum en route lag in the bearing information. At approach speeds of the order of 120 knots, the maximum lag is reduced to about 60 feet.

To accomplish this improvement in performance over the circuit of FIG. 1, the circuit arrangement illustrated by aircraft navigation receiver 220 in FIG. 8 may be adopted. REceiver 220 is like receiver 20 in its initial stages, comprising the antenna 21 connected to the high-frequency stage 22, which is in turn connected to a detector 23. In receiver 220, detector 23 is coupled to a limiter 29. The output of limiter 29 is supplied to a first signal channel 231 and to a second signal channel 232.

The first signal channel 231 comprises a high-pass filter 33, a limiter 34, a discriminator 35, and an additional limiter or other square wave generator 37 in that order. Filter 33 should be an active filter as defined above. The output of limiter 37 is connected to a frequency divider circuit 236 that is in turn connected to a differentiator 38 having a diode 45 in its output circuit.

The second signal channel 232 includes a low-pass filter 41 (preferably a CSR circuit), a limiter 46, a frequency divider 246, and a differentiator 44 having a diode 48 in series in its output circuit. The gating circuit is the same as in FIG. 1 and includes the gate circuit 46 connected to a pulse counter 49 that is in turn coupled to the utilization stages 52. As before, a reset circuit 51 is utilized to reset pulse counter 49. It should be noted that resetting is preferably accomplished in each cycle of operation and, with the illustrated arrangement, is carried out at the beginning of each cycle of the reference signal. If desired, however, reset circuit 51 can be connected to the output of signal channel 232 to reset the pulse counter at the end of the cycle, with appropriate time delay means to permit utilization of the count in the counter 49.

The clock source 241 of receiver 220 is somewhat different and is directly synchronized with the reference 30 Hz. signal in the output of limiter 36. It comprises a frequency multiplier 242, operating at a total factor of 36,000, having an input connected to the output of limiter 36. Multiplier 242 has its output connected to a discriminator 243. Discriminator 243 has a second input supplied from an oscillator 244. An automatic frequency control circuit 245 is connected to the output of discriminator 243 and is used to control the operating frequency of oscillator 244.

Operation of receiver 220 proceeds essentially as described above in connection with circuit 20 of FIG. 1. But the receiver of FIG. 8 affords a clock signal that is directly controlled in its operating frequency by the frequency of the 30 Hz. reference signal and, consequently, provides accurate operation even though the fundamental frequency of the signal as received from different stations may vary somewhat. The frequency division afforded by circuits 236 and 246 effectively eliminates the jitter effect discussed above in connection with FIGS. 6A through 7C. The receiver of FIG. 8 is essentially immune to amplitude changes and other distortions in the radiated signal. Unlike conventional receivers, it produces no phase or other similar distortions in its own internal operation.

FIG. 9 illustrates a modification for the digital VOR receiver 220 of FIG. 8. More specifically, FIG. 9 is a block diagram of a clock source 541 that may be employed instead of the clock source 241 of FIG. 8.

Clock source 541 comprises a phase detector 543 to which the 30 cycle square wave signal from limiter 36 is supplied. The output of phase detector 543 is supplied to an automatic frequency control circuit 545 that is in turn coupled to a voltage controlled oscillator 544. The output of oscillator 544 is coupled to gate 46 as in the previously described embodiment.

The output from oscillator 544 is also coupled to a frequency divider circuit 542. In this instance, the frequency divider operates with a division factor of 360 and the frequency of oscillator 544 is established as 10.8 kHz. However, a higher decimal multiple of the basic 30 Hz. frequency can be employed, as discussed above in connection with FIG. 8, if desired, and the division factor of circuit 542 is selected accordingly. The output of frequency divider 542 is supplied to the second input of phase detector 543.

The operation of clock source 541 is essentially similar to that of clock source 241 except that frequency division is employed instead of frequency multiplication. The two inputs to phase detector 543 are both at 30 cycles. Any variation in frequency or phase is detected by the phase detector and is employed to adjust the frequency or phase of oscillator 544, through the automatic frequency control circuit 545. Thus, oscillator 544 remains locked in frequency to the incoming 30 Hz. signal, the reference signal from limiter 36, at all times. The basic operation of the receiver remains unchanged. The frequency divider circuit 542 is somewhat simpler and less expensive than the corresponding multiplier circuit 242 of the embodiment of FIG. 8.

In order to afford a more explicit illustration of the novel CSR circuits that may be utilized in the present invention, specific circuit parameters for the circuit of FIG. 4 are set forth hereinafter. It should be understood that this information is presented by way of example and in no sense as a limitation on the invention.

Resistor 69: 10 ohms
Resistors 74, 76, 77, 85, 86, 87, 88: 10 kilohms
Capacitor 68: 3 microfarads
Diodes 71, 72: N270
Amplifiers 61, 81: uA741 Fairchild
B+, B−: 24 volts DC

I claim:

1. Aircraft navigation receiver apparatus, of the kind in which first and second data signals of given frequency radiated from a navigation station are compared to determine the orientation of the aircraft relative to a reference, comprising:

first and second signal channels for developing first and second gating signals representative of the phase and frequency of said first and second data signals, respectively;

each of said signal channels including active filtering means interposed in the signal channel;

a source of a clock pulse signal having a frequency many times higher than the frequency of said data signals;

pulse counter means;

gate means having an input connected to said clock signal source and an output connected to said pulse counter means;

means for applying said first and second gating signals to said gate means to actuate said gate between open and closed conditions, one of said gating signals opening said gate means and the other closing said gate means to sample said clock signal at a rate determined by the gating signals, whereby the count in said pulse counter means is representative of the phase differential between said first and second data signals;

reset means for resetting said pulse counter in each cycle of one of said gating signals;

and display means, coupled to said pulse counter, for displaying the orientation of the aircraft based on the count in said pulse counter.

2. Aircraft navigation receiver apparatus according to claim 1 in which said first signal channel includes a discriminator circuit in which said first data signal is multiplied by the first data signal shifted 90° in phase.

3. Aircraft navigation receiver apparatus according to claim 2 in which said discriminator circuit comprises a push-pull differential amplifier having two inputs to which said first data signal is supplied in phase opposition, the two stages of said amplifier each being driven to saturation and to cut off in alternate half cycles of said first data signal, and in which said first data signal is applied, with a phase shift of 90°, to a common connection for both stages of said differential amplifier.

4. Aircraft navigation receiver apparatus according to claim 1 for use with VOR signals in which each of said signal channels includes a low-pass filter comprising a constant slew rate circuit.

5. Aircraft navigation receiver apparatus according to claim 1 for use with VOR signals in which said first signal channel includes a high-pass filter comprising an active filter circuit and said second signal channel includes a low-pass filter comprising an active filter circuit, for segregating the first and second data signals from a received transmission.

6. Aircraft navigation receiver apparatus according to claim 1 in which said clock signal source includes an oscillator for generating said clock pulse signal, and synchronizing means for synchronizing said oscillator with one of said data signals.

7. Aircraft navigation receiver apparatus according to claim 6 in which said synchronizing means comprises a frequency multiplier for multiplying one of said data signals in frequency to develop a comparison signal of the same nominal frequency as said clock pulse signal, a frequency discriminator for comparing the output of said multiplier with the output of said oscillator, and an automatic frequency control circuit for controlling the operating frequency of said oscillator in accordance with the output from said discriminator.

8. Aircraft navigation receiver apparatus according to claim 7 for use with VOR signals, in which said frequency multiplier operates at a multiplication factor constituting a decimal multiple of 360 so that the count in said counter is a direct representation of the aircraft bearing expressed in degrees and decimal fractions thereof.

9. An aircraft navigation receiver apparatus according to claim 7 for use with VOR signals, in which said frequency multiplier operates at a multiplication factor constituting a decimal multiple of 21,600 so that the count in said counter is a direct representation of the aircraft bearing expressed in minutes of arc and decimal fractions thereof.

10. Aircraft navigation receiver apparatus according to claim 1 in which said clock signal source includes an oscillator for producing said clock pulse signal, a frequency divider coupled to said oscillator, a frequency discriminator for comparing the output of said frequency divider with said first data signal, and an automatic frequency control for controlling the operating frequency of said oscillator in accordance with the output of said discriminator.

11. Aircraft navigation receiver apparatus according to claim 10 for use with VOR signals, in which the operating frequency of said oscillator is a decimal multiple of 10.8 kHz., and the division factor of said frequency divider is a corresponding decimal multiple of 360 so that the count in said counter is a direct representation of the aircraft bearing expressed in degrees and decimal fractions thereof.

12. Aircraft navigation receiver apparatus according to claim 10 for use with VOR signals, in which the operating frequency of said oscillator is a decimal multiple of 648 kHz. and the division factor of said frequency divider is a corresponding decimal multiple of 21,600 so that the count in said counter is a direct representation of the aircraft bearing expressed in minutes of arc and decimal fractions thereof.

13. Aircraft navigation receiver apparatus, of the kind in which first and second data signals of given frequency radiated from a navigation station are compared to determine the orientation of the aircraft relative to a reference, comprising:

first and second signal channels for developing first and second gating signals representative of the phase and frequency of said first and second data signals, respectively, each of said first and second signal channels including a frequency divider for reducing the frequency of the gating signals, relative to said given frequency, to minimize the effect of noise in the data signals;

a source of a clock pulse signal having a frequency many times higher than the frequency of said data signals;

pulse counter means;

gate means having an input connected to said clock signal source and an output connected to said pulse counter means;

means for applying said first and second gating signals to said gate means to actuate said gate between open and closed conditions, sampling said clock signal at a rate determined by the reduced frequency of the gating signals, whereby the count in said pulse counter means is representative of the phase differential between said first and second data signals;

and display means, coupled to said pulse counter, for displaying the orientation of the aircraft based on the count in said pulse counter.

14. Aircraft navigation receiver apparatus, of the kind in which first and second data signals of given frequency radiated from a navigation station are compared to determine the orientation of the aircraft relative to a reference, comprising:

first and second signal channels for developing first and second gating signals representative of the phase and frequency of said first and second data signals, respectively;

a source of a clock pulse signal having a frequency many times higher than the frequency of said data signals;

pulse counter means;

gate means having an input connected to said clock signal source and an output connected to said pulse counter means;

gate control means for applying said first and second gating signals to said gate means to actuate said gate between open and closed conditions, sampling said clock signal at a rate determined by the gating signals, whereby the count in said pulse counter means is representative of the phase differential between said first and second data signals, said gate control means including sampling rate modifying means for reducing the sampling rate to conform to a predetermined sub-multiple of said given frequency;

and display means, coupled to said pulse counter, for displaying the orientation of the aircraft based on the count in said pulse counter.

15. Aircraft navigation receiver apparatus according to claim 14 in which said clock signal source includes an oscillator for generating said clock pulse signal, and synchronizing means for synchronizing said oscillator with one of said data signals, said synchronizing means comprising a frequency multiplier for multiplying one of said data signals in frequency to develop a comparison signal of the same nominal frequency as said clock pulse signal, a frequency discriminator for comparing the output of said multiplier with the output of said oscillator, and an automatic frequency control circuit for controlling the operating frequency of said oscillator in accordance with the output from said discriminator.

16. Aircraft navigation receiver apparatus according to claim 15 for use with VOR signals, in which said frequency multiplier operates at a multiplication factor constituting a decimal multiple of 360 so that the count in said counter is a direct representation of the aircraft bearing expressed in degrees and decimal fractions thereof.

17. An aircraft navigation receiver apparatus according to claim 15 for use with VOR signals, in which said frequency multiplier operates at a multiplication factor constituting a decimal multiple of 21,600 so that the count in said counter is a direct representation of the aircraft bearing expressed in minutes of arc and decimal fractions thereof.

18. Aircraft navigation receiver apparatus according to claim 14 in which said clock signal source includes an oscillator for producing said clock pulse signal, a frequency divider coupled to said oscillator, a frequency discriminator for comparing the output of said frequency divider with said first data signal, and an automatic frequency control for controlling the operating frequency of said oscillator in accordance with the output of said discriminator.

19. Aircraft navigation receiver apparatus according to claim 18 for use with VOR signals, in which the operating frequency of said oscillator is a decimal multiple of 10.8 kHz. and the division factor of said frequency divider is a corresponding decimal multiple of 360 so that the count in said counter is a direct representation of the aircraft bearing expressed in degrees and decimal fractions thereof.

20. Aircraft navigation receiver apparatus according to claim 18 for use with VOR signals, in which the operating frequency of said oscillator is a decimal multiple of 648 kHz. and the division factor of said frequency divider is a corresponding decimal multiple of 21,600 so that the count in said counter is a direct representation of the aircraft bearing expressed in minutes of arc and decimal fractions thereof.

* * * * *